Oct. 15, 1968   T. POLSFUT   3,405,477

FISHHOOK WITH LIVE BAIT HOLDING MEANS

Filed April 26, 1966

Theodore Polsfut
INVENTOR.

BY Clarence A. O'Brien
and Harvey B. Jacobson
Attorneys

United States Patent Office 3,405,477
Patented Oct. 15, 1968

3,405,477
FISHHOOK WITH LIVE BAIT HOLDING MEANS
Theodore Polsfut, Benedict, N. Dak. 58716
Filed Apr. 26, 1966, Ser. No. 545,351
8 Claims. (Cl. 43—44.6)

ABSTRACT OF THE DISCLOSURE

A clamp for live bait having a pair of arms joined by a coil spring which biases the arms together. The arms are angulated to cross each other and terminate in a pair of jaws normally abutting each other but which can be spread apart to allow the insertion of live bait therebetween with the jaws entering the gills of the bait, such as a minnow. Accordingly, the minnow or other bait is merely hitched to the clamp and, being uninjured, can swim along with the clamp attached. One end of the shank of a movable fishhook is operatively fastened to the coil spring and the barbed hook assumes an unobstructed position close to but in front of the jaws. A V-shaped rod provides for attachment of the line and one limb thereof is juxtaposed and joined to one of the arms of the clamp.

---

This invention relates to new and useful improvements in fishing devices, more particularly fishhooks, and the principal object of the invention is to provide a hook with means for holding live bait such as a minnow, so that the minnow is not pierced or otherwise damaged by the hook and is therefore capable of remaining alive for a considerable length of time.

This object is attained by associating the fishhook with a resilient clamp having a pair of opposing jaws which are adapted to be inserted in gills at the respective opposite sides of the minnow, so as to firmly retain the minnow in position in the clamp without injury by the hook. While firmly retaining the minnow, the clamp nevertheless permits the minnow to move and swim freely, and since the associated hook does not penetrate the minnow, it is better exposed and available for hooking a fish when it strikes. Also, the arrangement of the invention is such that the position of the hook relative to the minnow holding clamp may be adjusted for most effective results.

Other advantages of the invention reside in its simplicity of construction, efficient operation, and in its adaptability to economical manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
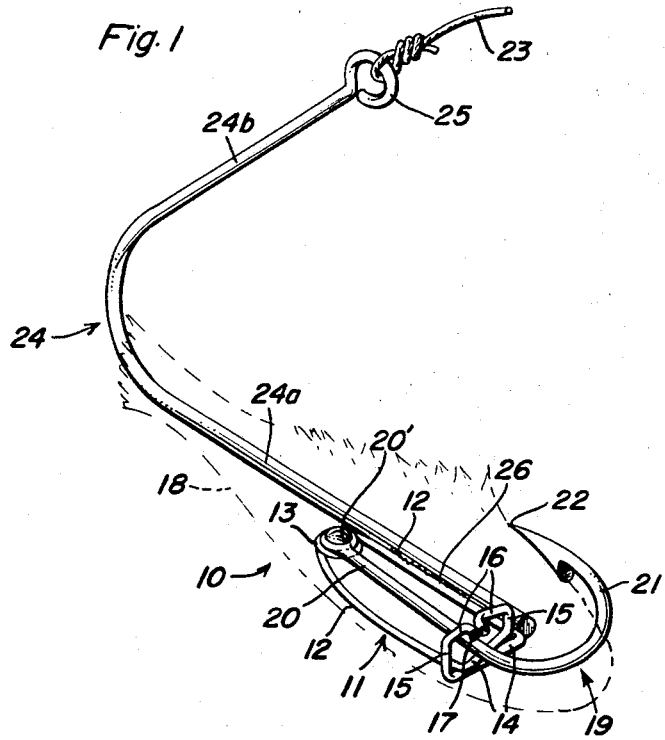
FIGURE 1 is a perspective view showing the device of the invention applied to a minnow, illustrated by dotted lines.

Referring now to the accompanying drawings in detail, the device of the invention comprises a fishhook with live bait holding means, the device being designated generally by the reference numeral 10.

The device 10 consists of a resilient clamp 11 which includes a pair of arms 12 which are connected together at one end thereof by an integral coil 13 and are movable toward and away from each other in a substantially horizontal plane, being resiliently biased together by the coil 13.

Figure 3:
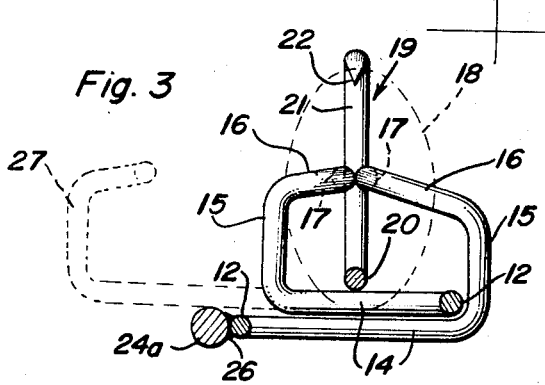
FIGURE 3 is an enlarged cross-sectional view, taken substantially in the plane of the line 3—3 in FIGURE 2.

The other end portions of the arms 12 are angulated inwardly and cross each other as at 14, whereupon they are upwardly offset or upturned as at 15, as will be clearly apparent from FIGURE 1. The upturned arm portions 15 are then turned inwardly with an upward slant as is best shown at 16 in FIGURE 3, the portions 16 terminating in a pair of opposing jaws 17 which, themselves, are forwardly angulated as shown.

It will be understood that by virtue of the upturned arm portions 15, the jaws 17 are movable toward and away from each other in a horizontal plane which is spaced above the plane of the arms 12. Also, by virtue of the crossed arm portions 14, the jaws 17 will be spread apart when the arms 12 are pressed together, and vice versa. The arrangement is such that live bait, specifically, a minnow indicated by the numeral 18, may be positioned in the clamp by spreading the jaws 17 apart, placing the minnow above the arms 12, and permitting the coil 13 to move the jaws 17 toward each other so that they enter the gills at the opposite sides of the minnow's body. The minnow will thus be firmly held in position in the clamp but will not be injured in any way. Also, the minnow will have sufficient freedom to move and swim along with the device, so in that respect the device may be regarded as being attached to the minnow, rather than the minnow as being attached to the device.

Figure 2:
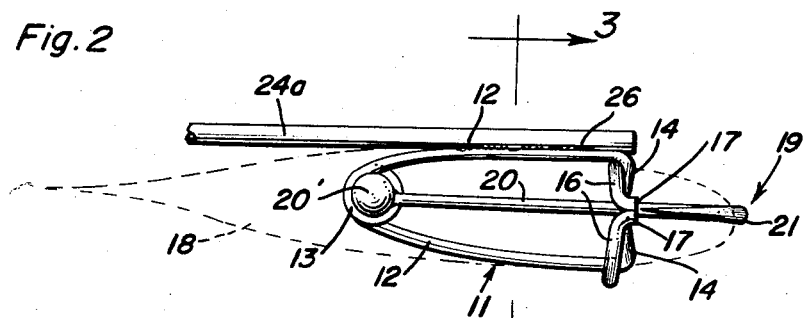
FIGURE 2 is a fragmentary top plan view thereof.

The hook component of the device indicated at 19 comprises a stem 20 which is secured at one end thereof to the aforementioned coil 13 as by a rivet 20' and extends therefrom substantially longitudinally centrally between the arms 12, above and beyond the crossed arm portions 14, where it is provided with a bill portion 21 terminating in a rearwardly oriented point 22. It will be noted that the bill portion 21 of the hook is disposed adjacent the clamp jaws 17, but it is located outside of the clamp beyond the jaws, so as to afford clearance for the minnow's head as shown in FIGURE 2. Although the stem 20 of the hook is secured to the coil 13 by the rivet 20', the rivet permits the stem to be moved laterally toward either or the other of the clamp arms 12, so that the position of the bill portion 21 and hook point 22 may be adjusted laterally relative to the jaws 17 and, consequently, relative to the minnow held in the clamp, for most efficient results. The stem remains in an adjusted position by friction at the rivet, until a readjustment is made. It will be appreciated that inasmuch as the hook does not penetrate the minnow, the bill portion 21 of the hook is fully exposed for catching a fish when it strikes.

Means are provided for attaching the clamp 11 and the associated hook 19 to a fishing line 23, such means comprising a rod 24 which is curved intermediate the ends thereof to provide a substantially horizontal rod portion 24a and an upwardly and forwardly extending rod portion 24b, the latter terminating in an eye 25 to which the line 23 may be attached. The forward end region of the horizontal rod portion 24a is exteriorly juxtaposed and secured to one of the aforementioned arms 12 of the clamp 11, as for example by soldering or welding indicated at 26. As will be apparent from FIGURE 3, the securing of the rod portion 24a to the associated clamp arm 12 does not interfere with the opening movement of the clamp to the spread apart position of its jaws 17, as indicated by the dotted lines 27.

The forward slant of the rod portion 24b serves to locate the line attaching eye 25 substantially above the center of gravity of the device and minnow therein, so that the swimming movement of the minnow is not impaired and the line 23 does not become entangled when the device is used.

What is claimed as new is as follows:

1. In a fishing device, the combination of a one piece bait holding clamp including a pair of duplicate arms capable of movement toward and away from each other and resiliently biased together, said arms being provided at their free ends with extensions turned inwardly toward each other and terminating in substantially parallel, angularly-bent portions forming a pair of opposing jaws normally abutting each other and adapted to be inserted in gills at the respective opposite sides of a live minnow whereby to harness and hold the latter in an upright position in said clamp, means carried by and for attaching the clamp to a fishing line, and a fishhook connected to the clamp and having a barbed bill portion disposed adjacent said jaws.

2. The device as defined in claim 1 wherein said clamp also includes a spring coil connecting said arms at one end thereof and biasing the same and said jaws together, the other end portions of said arms being angulated and mutually crossed, and said jaws being provided at terminal ends of said crossed arm portions whereby the jaws may be manually spread apart when said arms are moved together.

3. The device as defined in claim 2 wherein the angulated portions of said arms after crossing each other are perpendicularly offset whereby said jaws are movable in a plane spaced vertically from the plane of said arms.

4. The device as defined in claim 2 wherein said hook includes a stem secured at one end thereof to said coil and extending substantially centrally between said arms to said bill portion located outside the clamp beyond said jaws.

5. The device as defined in claim 4 wherein the stem of said hook is movable to permit adjustment of the bill portion laterally relative to said jaws.

6. The device as defined in claim 1 wherein said clamp attaching means comprises a rod adapted at one end thereof for attachment to a line and having its other end portion juxtaposed and secured to one of said arms of the clamp.

7. The device as defined in claim 1 wherein said clamp attaching means comprises a rod having a substantially horizontal portion and an upwardly extending portion terminating in an eye for attachment to a line, said horizontal rod portion being juxtaposed and secured to one of said arms of the clamp.

8. The device as defined in claim 7 wherein said upwardly extending portion of said rod is slanted so that said line attaching eye is disposed substantially above said clamp.

References Cited

UNITED STATES PATENTS

| | | | |
|---|---|---|---|
| 794,352 | 7/1905 | Gebhardt | 43—44.6 |
| 991,745 | 5/1911 | Randal | 43—44.6 |
| 1,464,571 | 8/1923 | Hanson | 43—44.4 |
| 1,862,187 | 6/1932 | Lageson | 43—44.6 |

SAMUEL KOREN, *Primary Examiner.*

D. J. LEACH, *Assistant Examiner.*